Nov. 25, 1930.  E. F. W. ALEXANDERSON ET AL  1,783,031
TRANSMISSION OF PICTURES
Filed July 24, 1928
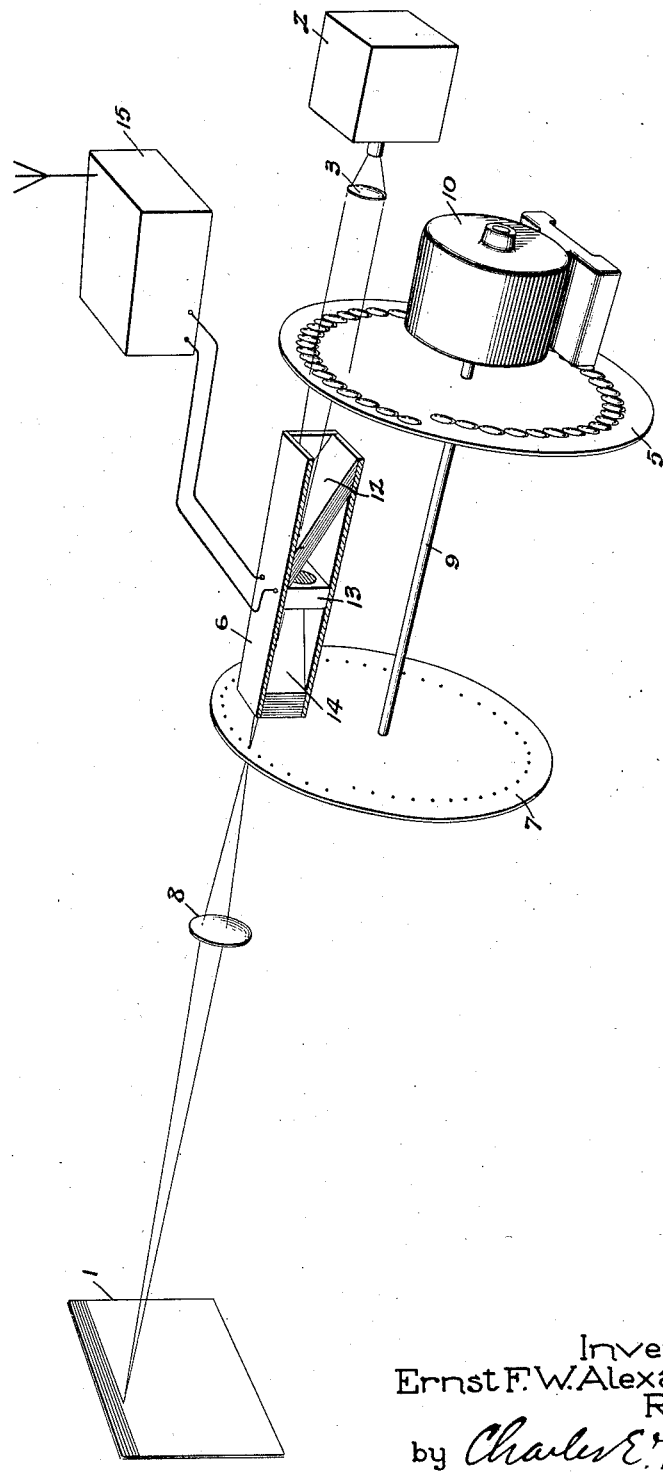
Inventors:
Ernst F. W. Alexanderson,
Ray D. Kell,
by Charles E. Tullar
Their Attorney.

Patented Nov. 25, 1930

1,783,031

UNITED STATES PATENT OFFICE

ERNST F. W. ALEXANDERSON, OF SCHENECTADY, AND RAY D. KELL, OF SCOTIA, NEW YORK, ASSIGNORS TO GENERAL ELECTRIC COMPANY, A CORPORATION OF NEW YORK

TRANSMISSION OF PICTURES

Application filed July 24, 1928. Serial No. 295,006.

Our invention relates to the transmission of pictures, and has for its principal object the provision of an improved system and method of operation which may be readily utilized to transmit and receive pictures through any suitable medium such as a high frequency carrier wave modulated in accordance with the shades of the picture.

Most of the picture transmitting systems heretofore provided includes means for successively scanning the elemental areas of the picture, means for establishing and maintaining synchronism between the moving parts of the transmitting and receiving apparatus, and means for producing electrical impulses dependent on the light reflected from the successive elemental areas of the picture. The means utilized to convert light impulses into electrical impulses and vice versa may assume various forms. One of the forms which has been used to some extent is a Kerr cell device such as that disclosed in a British patent of August Karolus No. 235,857.

As explained in the foresaid British patent, this device includes a Kerr cell mounted between a pair of Nicol prisms and arranged to be subjected to an electrostatic or magnetic field which is varied in accordance with the shade of the transmitted picture. In the operation of the device, light from a suitable source is projected successively through one of the Nicol prisms by which it is polarized in a single plane, through the Kerr cell which rotates it through an angle dependent on the intensity of the electrostatic or magnetic field of the cell and through the other Nicol prism which analyzes the light beam or transmits light of an intensity dependent on the rotational effect produced on the polarized light by the Kerr cell. The intensity of the light transmitted through the device is thus dependent on the intensity of the electrostatic field and may be applied either to a light sensitive cell for producing electrical impulses or to a receiving screen through a scanning disk or the like.

In the practical application of this Kerr cell device to picture transmision systems, difficulty is encountered due to the fact that Nicol prisms capable of transmiting the required amount of light, are very costly and are apt to be injured by very intense light. In accordance with our invention, this difficulty is avoided by the provision of an improved arrangement wherein a plurality of glass plates or the like are arranged to polarize the light applied to the Kerr cell and to transmit the polarized light from the Kerr cell to the picture receiving screen. As will be explained hereinafter this improved arrangement includes means for clearly defining the light which tends to be blurred by the reflections from the glass surfaces.

Our invention will be better understood from the following description when considered in connection with the accompanying drawing and its scope will be pointed out in the appended claims.

The single figure of the drawing is a diagrammatic showing of a picture receiving apparatus wherein our invention has been embodied.

This apparatus includes a receiving screen 1 to which light from a source mounted in an enclosure 2 is projected as parallel light through lens 3, a lens disk 5, a Kerr cell device 6, a perforated disk 7 and a lens 8. The disks 5 and 7 are mounted on a shaft 9 and may be driven by any suitable means such as a motor 10 which is operated in synchronism with the moving parts of the picture transmitting apparatus.

The device 6 includes a casing within which are mounted a stack of glass plates 12 for polarizing the light in a single plane, a Kerr cell 13 and a group of glass plates 14 for analyzing the light transmitted through the Kerr cell. Electrical impulses dependent on the shade of the transmitted picture are applied to the Kerr cell 6 through a radio receiving apparatus 15.

In the operation of the apparatus, it has been found that the improved Kerr cell device is capable of controlling large amounts of light but tends to produce a blurred image due to multiple reflections from the surfaces of the glass plates. This difficulty is avoided by the lens disk 5 and the perforated disk 7 which are so arranged that the blurred image is applied to the perforated disk 7 and is clearly defined before it is applied to the receiving screen. With this arrangement, a very distinct image is produced at the receiving screen and transmission and reception of comparatively large pictures may be realized.

What we claim as new and desire to secure by Letters Patent of the United States, is:

1. A picture transmitting system including a Kerr cell, polarizing groups of transparent plates mounted on opposite sides of said cell, the planes or polarization of the two groups being arranged at right angles to each other, a lens disk arranged to project light through said plates and said cell, and a perforated disk arranged to receive the light transmitted through said cell and said plates.

2. A picture transmitting system including a Kerr cell, polarizing groups of transparent plates mounted on opposite sides of said cell, the planes of polarization of the two groups being arranged at right angles to each other, a lens disk arranged to project light through said plates and said cell, a perforated disk arranged to receive the light transmitted through said cell and said plates, and driving means mechanically coupled to said perforated and lens disks.

3. A picture transmitting system including a Kerr cell, polarizing groups of glass plates arranged on opposite sides of the cell with their planes of polarization at right angles to each other, a lens disk and a perforated disk between which the cell and the plates are positioned, a shaft on which said disks are mounted, a motor for rotating the shaft, and means for projecting light through the disks, the cell and the plates.

In witness whereof, we have hereunto set our hands this 23rd day of July, 1928.

ERNST F. W. ALEXANDERSON.
RAY D. KELL.